United States Patent
Birum et al.

(10) Patent No.: US 7,100,152 B1
(45) Date of Patent: Aug. 29, 2006

(54) SOFTWARE ANALYSIS SYSTEM HAVING AN APPARATUS FOR SELECTIVELY COLLECTING ANALYSIS DATA FROM A TARGET SYSTEM EXECUTING SOFTWARE INSTRUMENTED WITH TAG STATEMENTS AND METHOD FOR USE THEREOF

(75) Inventors: Derrick Jason Birum, Duvall, WA (US); Richard Donald Ellis, Carnation, WA (US); Jeffrey Lee Tinker, Kenmore, WA (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 09/494,765

(22) Filed: Jan. 31, 2000

(51) Int. Cl.
*G06F 9/44* (2006.01)

(52) U.S. Cl. ............... 717/131; 717/124; 717/126; 717/127; 717/128; 717/130; 707/100; 714/38

(58) Field of Classification Search ............. 717/124, 717/127, 128, 129, 131, 126, 138, 130; 707/100; 714/38
See application file for complete search history.

(56) References Cited

U.S. PATENT DOCUMENTS

| | | | | |
|---|---|---|---|---|
| 4,720,778 A | | 1/1988 | Hall et al. ............... 364/200 |
| 4,914,659 A | | 4/1990 | Erickson ................. 371/19 |
| 4,937,740 A | | 6/1990 | Agarwal et al. .......... 364/200 |
| 5,228,039 A | | 7/1993 | Knoke et al. ............. 371/19 |
| 5,265,254 A | | 11/1993 | Blasciak et al. .......... 395/700 |
| 5,526,025 A | * | 6/1996 | Selwan et al. ............ 345/556 |
| 5,581,695 A | | 12/1996 | Knoke et al. .......... 395/183.04 |
| 5,655,121 A | * | 8/1997 | Delagi et al. ............ 717/124 |
| 5,748,878 A | | 5/1998 | Rees et al. ............ 395/183.04 |
| 5,911,059 A | | 6/1999 | Profit, Jr. ................ 395/500 |
| 6,106,571 A | | 8/2000 | Maxwell ................. 717/4 |
| 6,161,200 A | * | 12/2000 | Rees et al. .............. 714/38 |
| 6,298,320 B1 | | 10/2001 | Buckmaster et al. ......... 703/28 |
| 6,311,327 B1 | * | 10/2001 | O'Brien et al. ........... 717/114 |
| 6,381,656 B1 | | 4/2002 | Shankman ............... 710/18 |
| 6,434,738 B1 | * | 8/2002 | Arnow .................. 717/106 |
| 6,490,695 B1 | * | 12/2002 | Zagorski et al. ........... 714/38 |
| 6,510,434 B1 | * | 1/2003 | Anderson et al. .......... 707/100 |
| 6,609,247 B1 | * | 8/2003 | Dua et al. ............... 717/128 |
| 2001/0041974 A1 | | 11/2001 | Buckmaster et al. ......... 703/28 |
| 2002/0095660 A1 | | 7/2002 | O'Brien et al. ........... 717/127 |

FOREIGN PATENT DOCUMENTS

| | | |
|---|---|---|
| EP | 0 767 430 A2 | 4/1997 |
| EP | 0 867 151 A1 | 2/1999 |
| EP | 0 897 151 A1 | 2/1999 |

OTHER PUBLICATIONS

Title: Dynamic views of SGML tagged documents, author: B. Fraser et al Oct. 1999, ACM.*
Title: Type dispatch for named hierarchical types, author: Neal Glew, 1999, ACM.*
Title: Ada 9X tagged types and their implementation in GNAT, author: Cyrille Comar, ACM, Nov. 1994.*

* cited by examiner

*Primary Examiner*—Chameli Chaudhuri Das
(74) *Attorney, Agent, or Firm*—Andrews Kurth LLP

(57) ABSTRACT

A software analysis system having a filter for selectively collecting tags generated by a target system during execution of a software program under analysis in accordance to a programmable filtering criteria. The system includes a decoder for decoding the tag type of the tags captured from the data bus of the target system, and a comparator for comparing the tag types to the programmable filtering criteria to determine whether the tag should be collected. The programmable filtering criteria may be programmed by collecting filter tags from the target system, or directly programmed by a software developer using a filtering user interface. The programmable filtering criteria is implemented by a filter table that stores a flag associated with each tag type. The flag is indicative of whether tag data of a respective tag type should be collected. Tag data of the tag types meeting the programmable filtering criteria have timestamp information appended to the tag data and are collected in a tag buffer.

19 Claims, 4 Drawing Sheets

SOFTWARE ANALYSIS SYSTEM HAVING AN APPARATUS FOR SELECTIVELY COLLECTING ANALYSIS DATA FROM A TARGET SYSTEM EXECUTING SOFTWARE INSTRUMENTED WITH TAG STATEMENTS AND METHOD FOR USE THEREOF

TECHNICAL FIELD

The present invention relates to software testing and debugging, and more particularly, to collection of analysis information from target systems executing software instrumented with executable tag statements.

BACKGROUND OF THE INVENTION

Creating executable software code typically involves a software developer first creating a source code program with a text processing program, followed by compiling and linking the source code to create executable code for a specified computer processor. The executable code is subsequently stored in an executable file. The executable code can then be debugged by the software developer by executing the executable file on the specified computer processor to determine if the software performs its tasks correctly, or if instead one or more errors occur during execution. If the executable code has errors, the software developer can modify the source code in an attempt to remove the errors, recompile the source code, and then link the recompiled code to produce a new executable file for debugging. For large software programs, this process is repeated several times until all known errors are removed.

The debugging process, which is quite often a very involved process, many times requires the software developer to locate the cause of an error from executing the executable file. Various methods exist for a software developer to identify errors. In one such method, a software developer adds print statements throughout the source code so that as the executable file is executing, the corresponding executable print instructions are also executed to report the current progress of the execution. Knowledge of the current execution progress assists the software developer to identify the section of the code that is executing when an error occurs. Additionally, print statements can be used to also display the current value of variables or source code expressions at specified points throughout the execution. Since the print statements are part of the original compilation and linking process, the variables and expressions that are part of the print statements are evaluated in the context of the current variable scope, as would any other compiled code statement. An example of this is using the value of a local variable in a currently executing function rather than a variable with the same name in a different non-executing function.

In addition to print requests, application programs known as debuggers may be also used by the software developer to assist with locating errors in the executable code. A debugger loads executable code into memory and provides additional control over execution of executable files. For example, the software developer can use the debugger to execute one executable code instruction at a time. Alternately, the debugger may be used to execute the executable code continuously until a break point, designated by the software developer within the debugger, is reached. When execution of the executable code is stopped, a user can interact with the debugger to view current values of variables and expressions. Some debuggers can also reconstruct the source code from information stored in an executable code file during the compiling and linking steps, and display the source code lines that correspond to the instructions in the executable code. The display of the source code facilitates control by the software developer of the execution of the executable code.

Software developers debugging source code written for embedded systems face particular challenges when trying to analyze the performance of the software. An embedded system may be characterized as one whose primary purpose is to perform a specific function rather than to perform general computational functions. A microprocessor-based microwave oven controller, a microprocessor-based automobile ignition system, and a microprocessor-based telephone switching system are all examples of embedded systems. The techniques of debugging software discussed above are not easily applied to software written for embedded systems. One reason is that many embedded systems include only a central processor and limited memory, and do not include access to other standard computer system input or output devices, such as a keyboard or display. As such, it is often difficult for a software developer to debug or analyze the performance of software written for these types of systems using the conventional techniques. However, fortunately for the software developer, there are several alternative techniques, and software analysis equipment, that are more suited for analyzing software written for and executed in these types of systems.

One such technique uses executable code marker statements inserting into spaces created in the source code during compilation. That is, the source code is prepared for debugging by compiling the source code and inserting empty spaces following each function of the source code. The empty spaces are reserved for inserting the code markers during an analysis phase by the software developer after the source code has been compiled and linked. The inserted code markers are captured by a debugging system during the execution of the modified compiled source code, and the results from the collection of code markers are used as a means of determining the performance of the software program. For example, each tag statement may write a value to a respective address so that the identity of the address containing that value provides an indication of which tag statements were executed. The data is collected by the host system and displayed in a manner that assists the software developer with debugging and evaluating the performance of the software. A more detailed description of this technique and analysis system is provided by U.S. Pat. No. 5,265,254, to Blasciak et al.

Another technique and analysis system employs a host system coupled to the microprocessor of an embedded system. Executable tag statements inserted into a source code are executed along with the compiled and linked source code. Each of the tag statements cause the microprocessor to write a tag to a predetermined address location in a memory of the embedded system. A probe coupled to the external terminals of the embedded system monitors an address bus for the predetermined address, and when detected, latches data provided by an executed tag statement from a data bus. Based on the value of the data latched, the analysis system is able to determine the location in the source code being executed. A more detailed description of this technique and analysis system is provided by U.S. Pat. No. 5,748,878, to Rees et al.

Although the aforementioned techniques and analysis systems provide the software developer with powerful tools for debugging and evaluating the software for embedded systems, it is difficult in these systems to modify the type of data collected during the execution of the instrumented source code. These systems typically allow the software developer to manually insert a limited number of executable statements into the executable code after compilation and linking. However, where the modifications to the executable statements are extensive, or the source code is long, such a technique is inefficient and impractical. Thus, adding or deleting executable statements from the executable code often requires the software developer to instrument, compile, and link the source code each time changes are made.

SUMMARY OF THE INVENTION

The present invention relates to a software analysis system for analyzing software executing on a target system. The software analysis system includes a filter to selectively collect tags emitted by the target system during execution of the software instrumented with executable tag statements. The tags are captured and the decoded tag type of the captured tag is compared to a programmable filtering criteria to determine whether tag data of the captured tag should be collected and processed. The programmable filtering criteria may be implemented by a filter table that stores a collection flag for each tag type. The collection flag is indicative of whether the respective tag types should be collected when emitted from the target system. The programmable filtering criteria may be modified by collecting filter tags emitted by the target system during execution of the instrumented software, or by direct modification by a software developer through a user interface.

According to another aspect of the present invention, the analysis system includes a tag buffer to store the collected tag data prior to processing.

According to another aspect of the present invention, the analysis system includes a timestamp generator for appending timestamp information to the tag data when stored in the tag buffer.

DETAILED DESCRIPTION OF THE INVENTION

Figure 1:
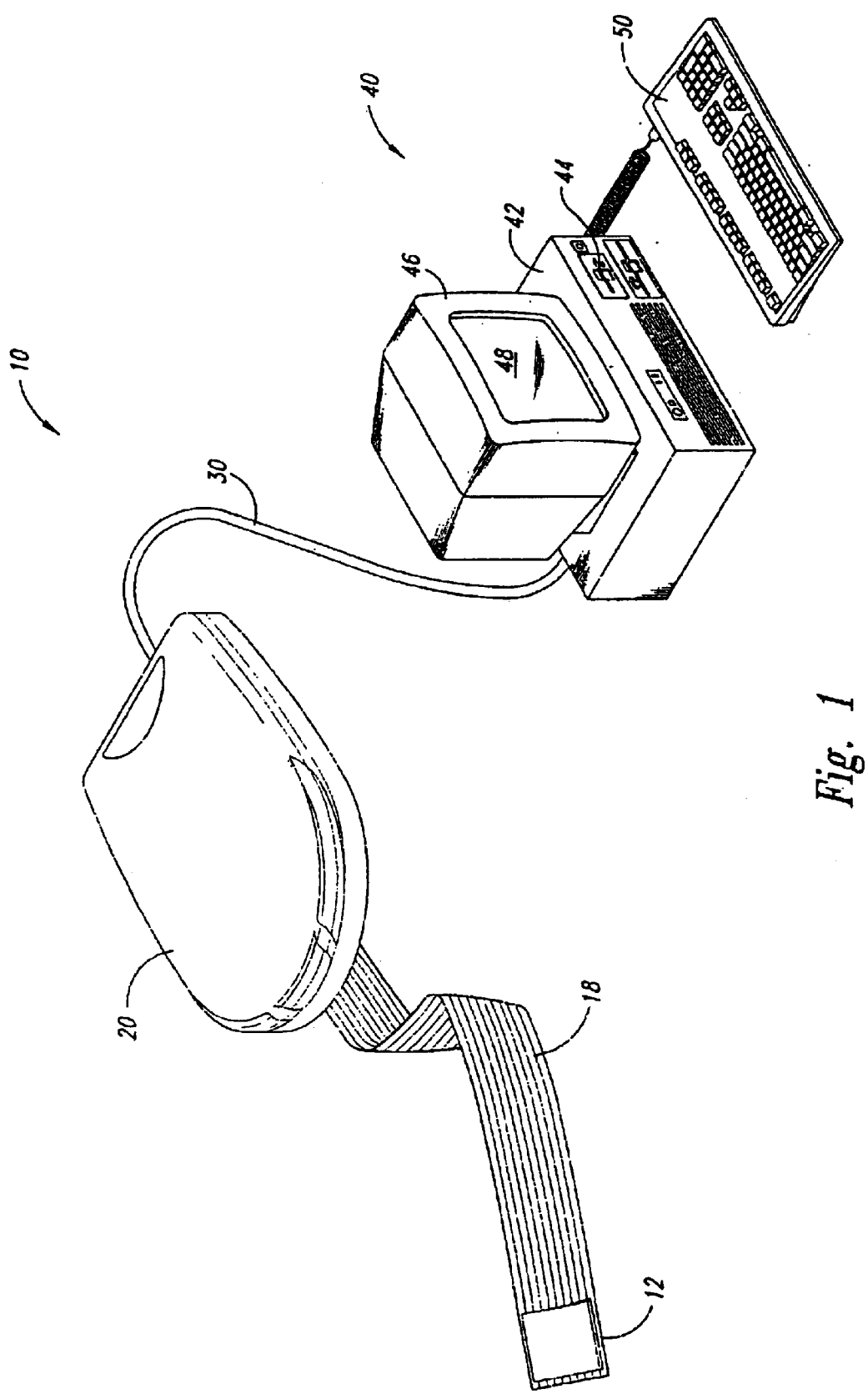
FIG. 1 is an isometric view of a software analysis system according to an embodiment of the present invention.

One embodiment of a software analysis system 10 in accordance with the present invention is illustrated in FIG. 1. The system 10 includes a probe tip 12 that clips onto the microprocessor of a target system (not shown) in a conventional manner. As a result, the external connector pins of the target system microprocessor, including its data bus and address bus, are accessible to the probe tip 12. The probe tip is connected through a conventional ribbon conductor 18 to a probe chassis 20 containing most of the electronics for the system 10. The probe chassis 20 is, in turn, connected through a suitable cable 30, such as an Ethernet cable, to a host system 40. The host system 40 is essentially a conventional PC computer having a processor chassis 42 with a disk drive 44, a CRT monitor 46 with a display screen 48, and a keyboard 50. The host system 40 preferably uses a Unix® or Windows® user interface and operating system. Application specific software is loaded through the disk drive 44 to cause the host system 40 to properly interface with the probe chassis 20, receive appropriate configuration and operating commands through the keyboard 50, and display analysis results on the screen 48.

Figure 2:
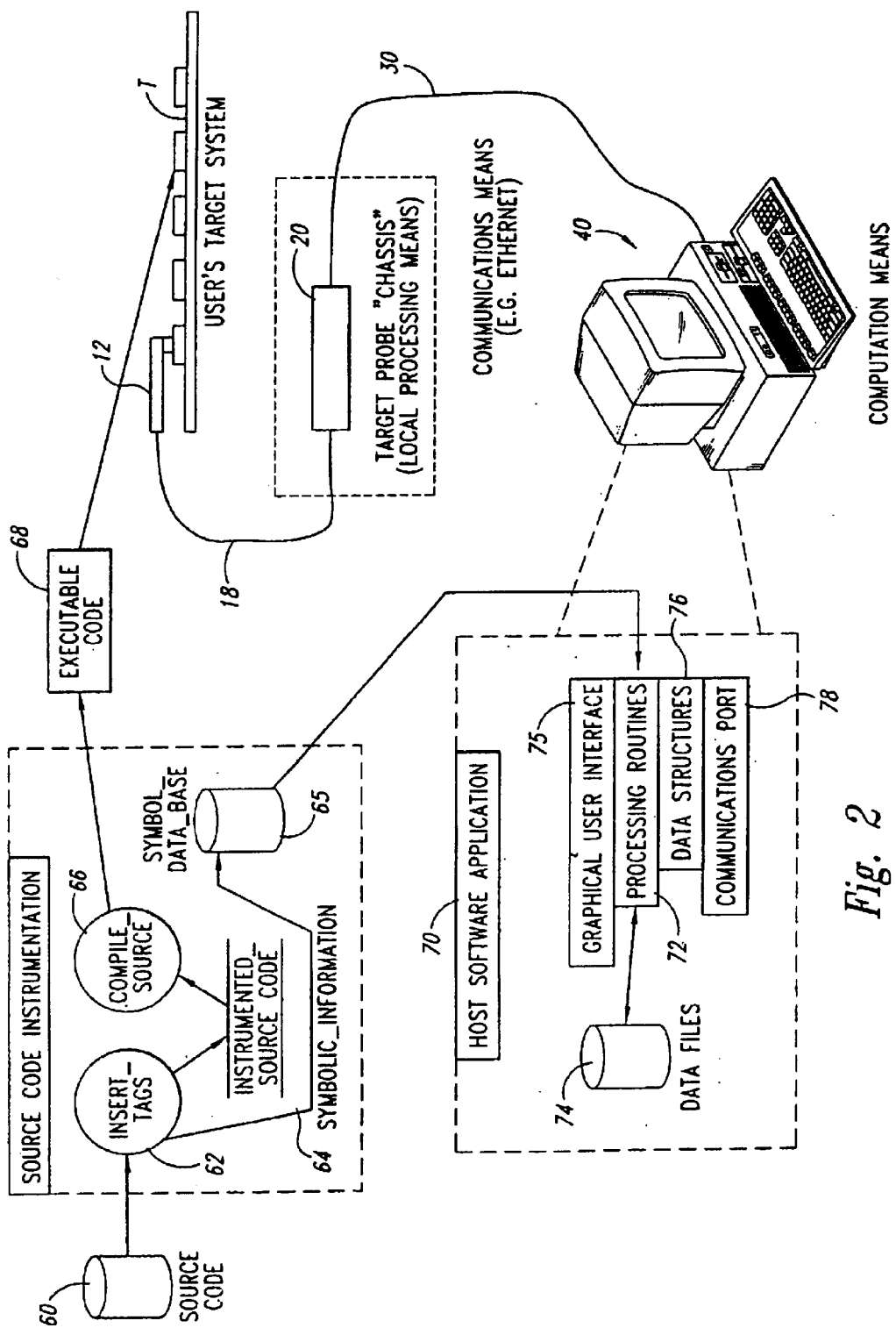
FIG. 2 is a schematic and block diagram of the software analysis system of FIG. 1 and its manner of use.

The use of the software analysis system 10 is illustrated in FIG. 2. Source code 60 written to run on a target system is first instrumented by inserting tag statements 62 in the source code 10 at various locations that the user is interested in analyzing. For example, if the user is interested in determining code coverage, the user will insert a tag statement 62 in each branch of the source code 60, and the system 10 will determine which of the branches have been executed based on whether each tag statement has been executed. Other types of analysis functions are described in detail in the Rees et al. patent, which is incorporated herein by reference. The insertion of tag statement 62 in the source code 60 results in instrumented source code 64. When the instrumented code 64 is produced, a symbol database 65 is also created, which provides a record correlating each of the tag statements to their locations in the source code 10. The instrumented source code 64 is compiled in a conventional manner at 66 thereby resulting in executable code 68. The executable code 68 is then loaded into the target system T by any suitable means. For example, the executable code may be stored in a programmable read-only memory ("PROM") that is installed in the target system T. The executable code 68 may also be executed in the target system T through a conventional emulator (not shown). Regardless of how the executable code 68 is loaded into the target T, the target T is then allowed to execute the code. The probe tip 12 clips on to the target system T in a conventional manner to make electrical contact with at least the address bus and the data bus of the target system T. Tags generated by the execution of tag statements 62 and collected by the probe tip are transferred to the probe chassis 20 through ribbon cable 18. After the probe chassis 20 has filtered and processed the data from the probe tip 12, it outputs appropriate data to the host system 40 through the local area network cable 30.

Host application software 70 includes processing routines 72 that store data in and retrieve data from data files 74, and the host application software 70 also includes a graphical user interface 75, such as the X-11 or Microsoft Windows® interface, that works with the processing routines 72 to operate on the data files 74 and provide various displays of analysis data. The processing routines 72 also receive the symbol database 65 so that the tag execution data in the data files 74 can be correlated with the location of the tag statements in the source code 65 in order to provide reports and displays that specify performance in terms of source code locations and branches. The symbol database 65 is preferably loaded into the host through the disk drive 44 (FIG. 1). The host application software 70 also includes data structure 76 for storing and handling the analysis data, and communications software 78 for providing communication with the target access probe 20.

In operation, each of the tag statements 62 generate a respective tag containing a data field having a "tag value" that is generally unique to the location of the tag statement in the source code 60. Thus, for example, a first branch may contain a tag statement having a tag value of 1. A second branch may contain a tag statement having a tag value of 2, and so forth. When the tag statement 62 is executed by the target T, a processor in the target T writes a tag containing the tag value to a predetermined location in the address space of the target system T, also known as a tag port address. As explained in greater detail below, the tag 62 may also contain at least one other field providing information about its function or location of its associated tag statement 62 in the source code 60. More specifically, the tag statement 62 preferably writes a tag consisting of 32 bits which includes not only a data field word having a tag value, but also a number of bits which define the type or category of tag. For example, different tag types may identify function entry and exit points, branch points, and memory allocation statements. Tags having a tag type field to identify the tag type are known as "control tags." In the preferred embodiment of the system 10, all control tags are written to the same tag port address.

The system 10 also utilizes data tags. Data tags accompany control tags and are written to a second tag port address to provide additional information relevant to a particular control tag. For example, a control tag may indicate that a memory allocation is taking place, and two data tags accompanying the control tag may indicate the size of the memory allocation and the memory pointer associated with that allocation, respectively. Since only a single location in the address space of the target system preferably is used for control tags and a relatively few locations used for data tags, the preferred embodiment of the inventive system 10 does not significantly use the memory resources of the target system, thus making the analysis system substantially transparent to the target system.

In addition to the control and data tags described in U.S. Pat. No. 5,748,878 to Rees et al., the embodiments of the present invention further include a filter tag, which is used to modify the criteria for collecting the tags from the target system T. The filter tag is itself a special type of control tag. The system 10 can collect (i.e., write to a tag buffer) specific types of tags from the target system, rather than collect every tag from the target T during the execution of the instrumented software program, as with the software analysis system described in detail in the aforementioned patent to Rees et al. As will be explained in further detail below, all of the possible types of control and data tags, as well as an associated collection flag indicating whether the particular tag type should be collected, are stored in a filter table. The filter tags instrumented into the source code, and emitted by the target system during execution, may be used by the system 10 to modify the status of the collection flags for the various tag types. Thus, collection of specific tag types may be altered while the software program is being executed by the target system.

Including a collection filtering mechanism in the system 10 that can be used to reduce the overall data collected by the trace system provides many benefits. One such benefit is that the required storage resources may be reduced because only the tag types desired by the software developer are collected by the system 10. For a hardware based collection mechanism, that is, where tags are collected from the target system T through a probe and stored in a dedicated hardware buffer, there are lower material costs resulting from the decrease in the required buffer size. For a software collection mechanism that utilizes the memory of the target system as a tag buffer, less target system memory is used, and consequently, consumption of target resources is reduced. Generally, the hardware and software resources of the system 10 are better utilized. Another benefit is provided by way of faster post-processing time of the tag data since the amount of data collected by the system 10 is reduced to only the desired tag types. As a result, the display time of relevant information may be reduced, and the relevant information can be more clearly displayed. It can be appreciated that additional benefits may be provided by the embodiments of the present invention.

A tag data filtering method was briefly discussed in the Rees et al. patent. However, as described therein, the filtering method was related to only filtering the display of analysis data. In the trace system of the Rees et al. patent, the tag data is unconditionally collected by the software analysis system and the software developer can then filter the display of the unconditionally collected tags such that only the functions of interests are displayed. In contrast, the embodiments of the present invention can be programmed to selectively collect particular tags from the ones emitted by the Target system T during the execution of the instrumented software program.

The probe tip 12 monitors the address bus and the data bus of the target T and determines when the processor addresses the tag port addresses of the address space of the target system T. The probe tip 12 then captures the tag value currently on the data bus. As a result, the currently captured tag value indicates the location in source code 60 currently being executed. Moreover, the system 10 monitors the execution of the software in the target T in essentially real time since the probe 20 receives each of the tag values as it is captured. With the information collected by the probe chassis 20, the system 10 is capable of determining function and task execution times, coverage analysis (i.e., identifying portions of the source code executed or not executed), memory allocation analysis (i.e., identifying how much memory each allocation statement in the source code allocates and identifying specific allocation errors), and program tracing (i.e., creating a sequential history of the execution of the source code). Finally, the probe chassis 20 communicates with the host system 40 to upload the data and allow it to be displayed by the host system 40.

Figure 3:
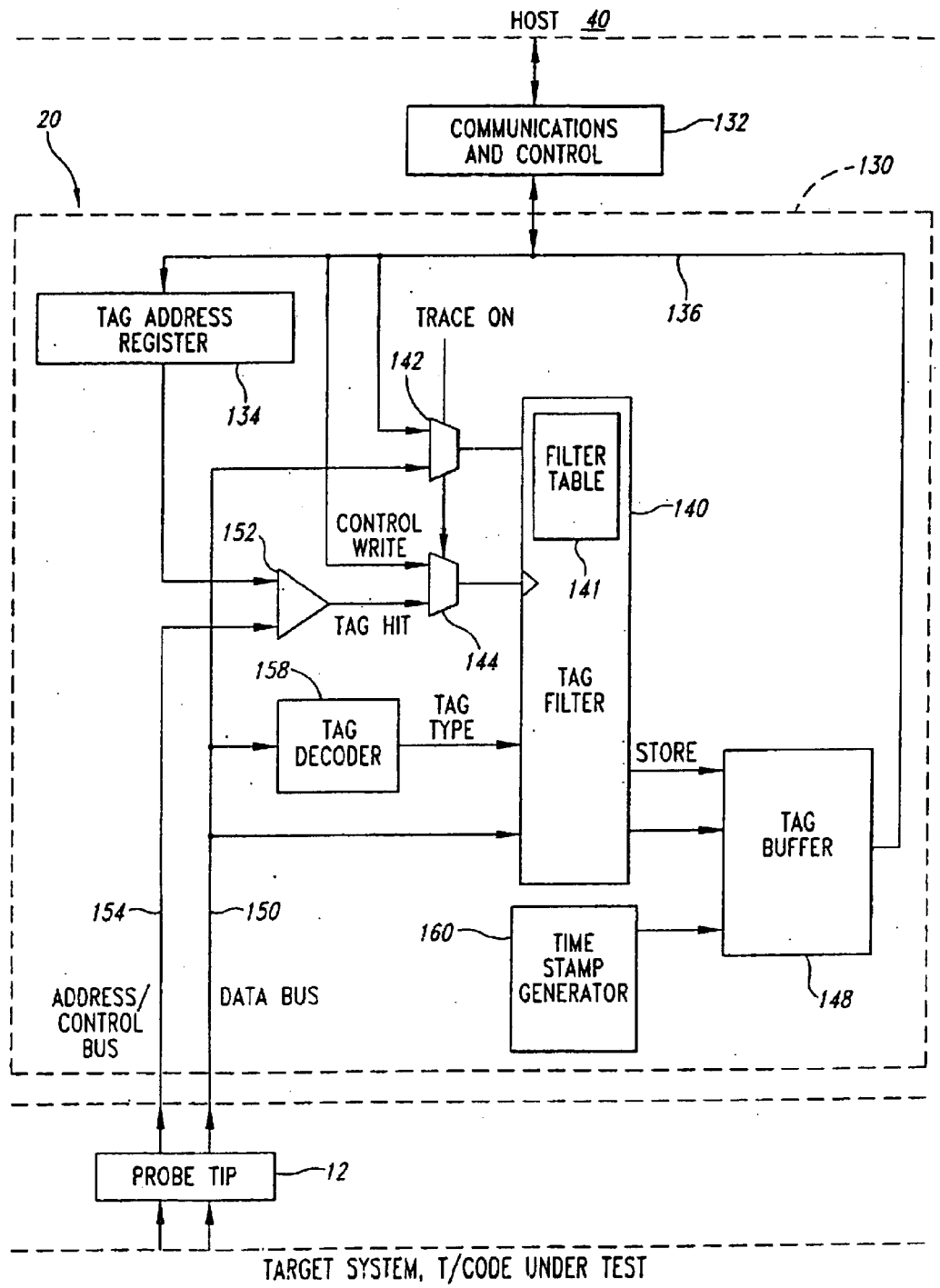
FIG. 3 is a schematic and block diagram of a trace buffer according to an embodiment of the present invention.

The software analysis system 10 of FIGS. 1 and 2 is shown in greater detail in the block diagram of FIG. 3. The probe chassis 20 includes a communications and control circuit 132 coupled to the host system 40 through the local area network cable 30 (FIG. 2). As mentioned previously, the interface between the probe chassis 20 and the host system 40 may consist of a standard Ethernet communication channel. The probe chassis 20 is further coupled to the target system T through the probe tip 12. As also mentioned previously, the probe tip 12 clips onto the target system T. Consequently, the probe tip 12 is usually specific to the particular microprocessor used by the target system T.

The software analysis system 10 has so far been described as being similar to the one described in the Rees et al. patent. However, the embodiments of the present invention have the capability to selectively collect specific tag types from the tags unconditionally emitted from the target system T during execution of the software program. Shown in FIG. 3 is an embodiment of a trace buffer 130 according to the present invention which is used to implement the tag filtering feature. The trace buffer 130 includes a tag register 134 that is programmed by the communications and control circuit 132 with the tag port addresses corresponding to the predetermined locations in the address space of the target system T. Typically, one tag port address is programmed for control tags and another tag port address is programmed for data tags. A tag filter 140 is coupled to the communication and control circuit 132 through multiplexers 142 and 144 for initialization and programming while the software analysis system 10 is disabled from the target system T.

A filter table 141 is implemented by the tag filter 140. The filter table 141 includes all of the possible types of control and data tags. Along with each tag type entry in the filter table 141 is a flag indicating the current collection criteria for that particular tag type. The filter table 141 is consulted by the tag filter 140 to determine which tag types emitted from the target system T will be collected. For example, if the flag associated with a particular tag type is set, that tag type will be collected. However, if the flag is not set, the tag type will be ignored although emitted from the target system T. Consequently, only those tag types having flags set as collectable in the filter table will be stored in a tag buffer 148. As will be discussed in greater detail below, the flags of the filter table 141 may be modified by either filter tags instrumented into the source code and collected by the trace buffer when emitted from the target system during the execution of the software program, or by the software developer directly accessing the filter table 141 through a filtering user interface.

When the software analysis system 10 is enabled, a TRACE ON signal switches the multiplexers 142 and 144 so that the tag filter 140 receives information from the data bus 150 and an output of a comparator 152, respectively. The comparator 152 generates a TAG HIT signal when an address detected on an address bus 154 matches one of the tag port addresses programmed in the tag address register 134. The TAG HIT signal is provided to the tag filter 140 and indicates that the tag presently on the data bus 150 should be preliminary collected. A tag decoder 158 decodes the tag type of the tag data preliminary collected and provides the tag type to the tag filter 140 to be compared with the current settings programmed in the filter table 141. If the tag type is determined as being one that should be collected by the system 10, the tag filter 140 provides a STORE signal to the tag buffer 148 indicating such. A timestamp generator 160 appends a timestamp to the tag data prior to being written into the tag buffer 148. The tag data and appended timestamp are eventually provided to the communications and control circuit 132 on the bus 136. The tag types determined as being not collectable are ignored by the system 10 and are not written to the tag buffer 148.

In contrast to receiving data tags, when filter tags are received by the system 10 on the data bus 150 and decoded by the tag decoder 158, they are written into the tag filter 140 instead of the tag buffer 148. The tag data of the filter tags are used to immediately update the status of the collection flags stored in the filter table 141 with new filtering information. Thus, the type of tag data collected and written to the tag buffer 148 will be modified as the software analysis system 10 is evaluating the target system T when a filter tag is collected.

A person of ordinary skill will appreciate that the chassis 20 also includes other conventional components for providing communication between the host 40 and the target system T. For example, a substitution memory into which the target system software is downloaded from the host 40 may be included, as well as communication ports that provide the host 40 and the target system T with a communication path upon which the two can communicate during the analysis. However, a detailed description of these components and their illustration in FIG. 3 have been omitted in the interests of brevity.

By using filter tags, the software developer would generally have to instrument the source code only once, and then use the filtering mechanism to fine tune the desired trace criteria. The software developer could instrument the source code with any variety of tag types, such as program tracing tags, data tracing tags, and memory allocation tags. However, during the software analysis session the software developer can dynamically filter out undesired information by using filter tags to modify the filter table so that the system 10 collects only the desired tag types. For example, the software developer may instrument the source code for program tracing, data tracing, and memory allocation. However, if program tracing is the only information currently desired by the software developer, the filter table may be modified by having the target system emit the appropriate filter tag so that only the program tracing tags are collected by the system 10.

The filter tags may be placed in the target system in a number of different ways. For example, the filter tags may be instrumented into the source code using an instrument or program. The software developer may also manually place filter tags into the source code. The filter tags may be nested in conditional statements so that the filter tags would be emitted by the target system T only if certain runtime conditions are satisfied. Alternatively, the filter tags may be placed into the target system during the analysis stage using the user interface of the host system 40.

Figure 4:
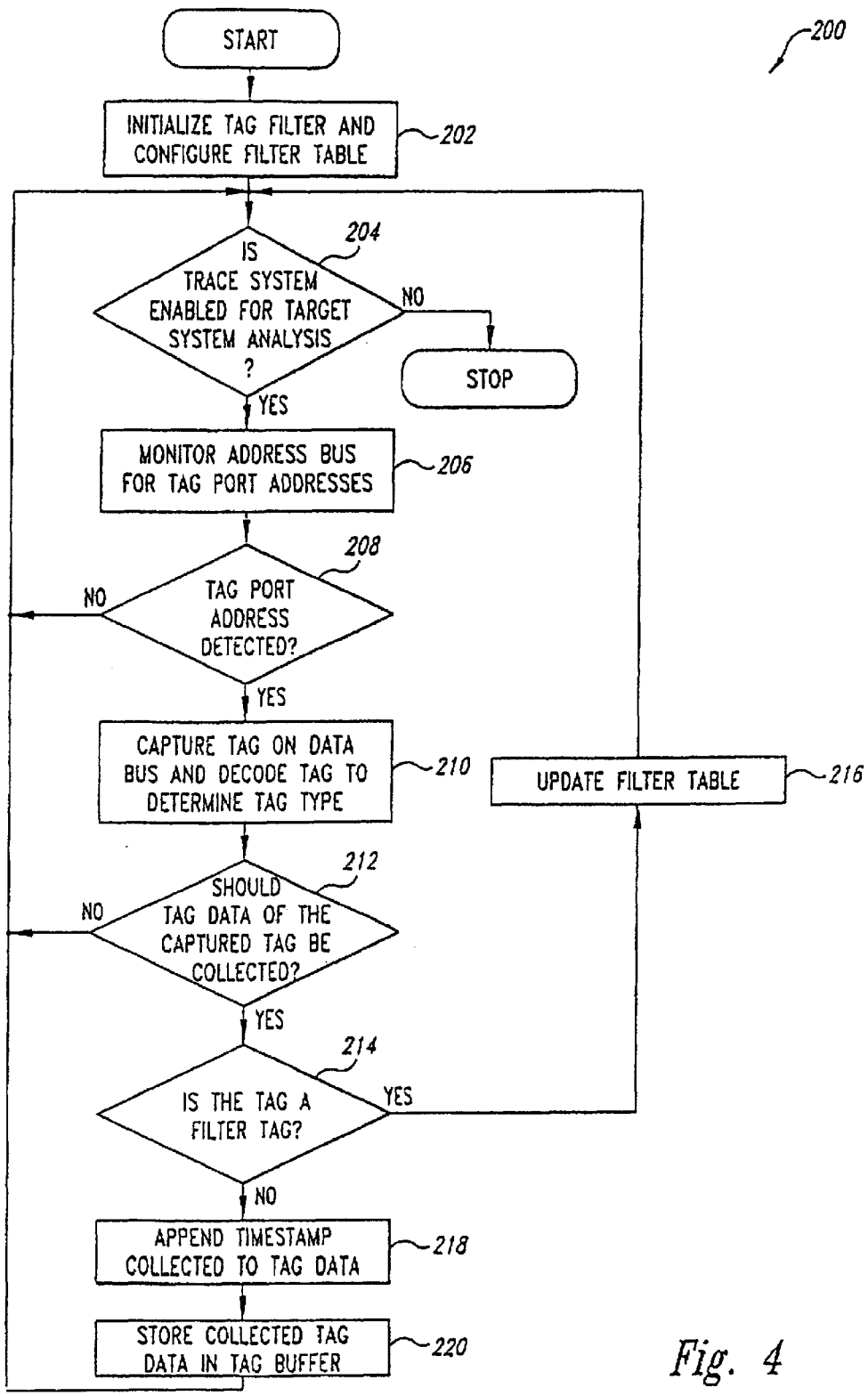
FIG. 4 is a flowchart of an operation of the trace buffer of FIG. 3.

Operation of the trace buffer 130 is described with respect to flowchart 200 shown in FIG. 4. At a step 202, the tag filter 140 is initialized by the communications and control circuit 132, and the filter table 141 is configured to indicate which tag types should be initially collected by the software analysis system 10. The system 10 is enabled at step 204, and at step 206 the trace buffer 130 begins monitoring the address bus 154 for addresses matching any of the tag port addresses programmed into the tag address register 134. When a tag port address is detected at step 208, the tag data presently on the data bus 150 is decoded by the tag decoder 158 to determine its tag type at step 210. At step 212, the tag filter 140 compares the tag type with the settings of the filter table 141 to determine whether the tag should be collected and written into the tag buffer 148. If the tag type is not to be collected, the software analysis system 10 returns to step 204 to determine if the trace system remains enabled and then continues to monitor the address bus 154 for the next occurrence of a tag port address at step 206. However, for those tag types that should be collected, the tag filter 140 will then determine whether the tag presently on the data bus 150 is a filter tag at step 214. Filter tags are provided at step 216 to the tag filter 140 for immediately updating the filter table 141. The system 10 subsequently returns to step 204 to determine if the trace remains enabled, and at step 206 continues monitoring the address bus 154 if the determination at step 204 is true.

Tag types that should be collected, but which are not filter tags, have a timestamp appended to the tag data at step 218 by the timestamp generator 160. The timestamp information will be used to provide information related to the relative timing of the receipt of the tags, and consequently, the relative timing of execution by the target system T. At step 220, the tag and its appended timestamp are written into the tag buffer 148 and will be subsequently read by the communications and control circuit 132. The system 10 then returns to step 204 and will continue to monitor the address bus and collect specific tag types until the system 10 is disabled from the target system T or until execution of the software program is completed.

In an alternative embodiment of the present invention, the filtering criteria programmed in the filter table 141 may also be directly modified by the software developer using the system 10. That is, the software developer could directly access the filter table 141 through a user interface and set which tag types should be collected by the system 10 when emitted by the target system T. A user interface, similar to that described in detail in the Rees et al. patent, could be integrated as a menu item into a command window of the system 10. For example, a filtering user interface could display a table representing the filter table 141 which contains all of the possible types of control and data tags available for collection by the system 10 and the current status of the collection flags for each of the tags. The software developer could then select which tag types the system 10 should collect by selectively setting the collection flags accordingly. All tag types not having the collection flag set for collection are ignored by the system 10 when emitted by the target system T.

The features of the embodiments of the present invention may also be used in conjunction to provide the software developer greater flexibility in analyzing software. For example, by using the filtering user interface, the software developer can directly access the filter table 141 and set whether the system 10 should collect or ignore any filter tags coming from the target system T. Where the collection flag for the filter tags is set so that filter tags emitted by the target system T are to be ignored, the tag collection criteria will remain the same until the software developer directly modifies the filter table 141 at a later time. However, where the collection flag for the filter tags is set so that filter tags are to be collected, the collection criteria will be modified each time a filter tag is emitted by the target system T.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A system for analyzing a software program executing on a target system, the target system accessing a predetermined memory location and applying tags to the data bus of the target system, each of the tags having a tag type and tag data when an executable tag statement instrumented in the software program is executed, the system comprising:
   a tag detection circuit coupled to an address bus of the target system to detect access of the predetermined memory location, and generate in response thereto a detection signal indicative of emission of a tag by the target system;
   a trace filter coupled to the tag detection circuit and the data bus of the target system to capture one of the tags in response to receiving the detection signal, the trace filter having a decoder circuit to decode the tag type of the captured tag, and a comparator circuit coupled to the decoder circuit to receive the tag type and determine whether the captured tag is collectable according to filtering criteria, wherein the trace filter is adapted to implement a filter table for storing the filtering criteria, the filter table having a list of tag types and associated collection flags indicating that the respective tag type is collectable when set; and
   a collection device coupled to the trace filter and structured to collect the tag data of collectable tags.

2. The system of claim 1 wherein the trace filter is programmable to allow the filtering criteria to be programmed.

3. The system of claim 1, further comprising a probe through which the tag detection circuit is coupled to the address bus and the trace filter is coupled to the data bus.

4. The system of claim 1, further comprising a host processor coupled to the collection device to receive and process the tag data of collectable tags.

5. The system of claim 1 wherein the collection device comprises a tag buffer to temporarily store the tag data of collectable tags.

6. The system of claim 5, further comprising a timestamp generator coupled to the tag buffer to append timestamp data to the tag data of collectable tags when stored in the buffer.

7. The system of claim 1 wherein the collection device comprises a processor to collect and process the tag data of collectable tags.

8. A system for analyzing a software program executing on a target system, the target system generating tags having a tag type and tag data in response to executing tag statements presents in the software program, the system comprising:
   a probe coupled to a data bus of the target system;
   a trace buffer coupled to the probe to capture tags generated by the target system, the trace buffer comprising:
      a decoder coupled to the data bus through the probe to decode the tag type of the captured tags;
      a tag filter coupled to the decoder to filter out non-collectable tag types and collect the tag data of collectable tag types in accordance to a programmable filtering criteria, wherein the programmable filtering criteria is implemented by a filter table having a collection flag associated with each tag type, the collection flag indicative of whether the respective tag type is collectable; and
      a buffer coupled to the tag filter to store the collected tag data; and
   a processor coupled to the trace buffer to process the collected tag data.

9. The system of claim 8 wherein the trace buffer further comprises a timestamp generator coupled to the buffer to append timestamp information to the stored tag data.

10. A system for analyzing software executing in a target system, the target system emitting tags having a tag type and tag data when an executable tag statement instrumented in the software program is executed, the system comprising:
    a detection means detecting tags emitted from the target system;
    a tag filtering means filtering the emitted tags according to a filtering criteria;
    a collecting means collecting tags satisfying the filtering criteria;
    a processing means processing the collected tags; and
    wherein the tag filtering means includes a programmable means to program the filtering criteria and the programmable means comprises a filter tag collected by the collecting means, the filter tag having tag data reprogramming the filtering criteria in accordance with the tag data of the filter tag.

11. The system of claim 10 wherein the tag filtering means comprises:
    a decoding means decoding the tag type of the emitted tags; and
    a comparator means comparing the decoded tag type of the filtering criteria, the comparator means further disregarding tags having tag types determined to be not collectable, and selecting tags having tag types determined to be collectable.

12. The system of claim 10 wherein the collection means comprises a tag buffer for temporarily storing collected tags prior to processing by the processing means.

13. The system of claim 12, further comprising a timestamp generator for appending timestamp data to the tag data when stored in the tag buffer.

14. The system of claim 10 wherein the processing means comprises a host processor.

15. A method for analyzing software executing in a target system, the target system generating tags having a tag type and tag data when an executable tag statement instrumented in the software program is executed, the method comprising:

detecting tags generated by the target system;

filtering the detected tags according to a programmable filtering criteria;

collecting tags satisfying the programmable filtering criteria; and reprogramming the programmable filtering criteria, wherein reprogramming the programmable filtering criteria comprises collecting a filter tag and setting a collection flag for the tag types in accordance with the tag data of the filter tag.

16. The method of claim 15, further comprising processing the collected tags.

17. The method of claim 15 wherein filtering the emitted tags comprises:

decoding the tag type of the detected tags;

determining a programmable collection status for each of the tag types in accordance with the programmable filtering criteria;

disregarding tags having tag types determined to be not collectable; and selecting tags having tag types determined to be collectable.

18. The method of claim 15 wherein collecting tags comprises storing the tag data in a tag buffer.

19. The method of claim 18, further comprising appending timestamp data to the tag data when stored in the tag buffer.

* * * * *